(12) United States Patent
Akimoto et al.

(10) Patent No.: US 7,503,208 B2
(45) Date of Patent: Mar. 17, 2009

(54) ENGINE MISFIRE DETECTION APPARATUS FOR INTERNAL COMBUSTION ENGINE AND ENGINE MISFIRE DETECTION METHOD

(75) Inventors: Hikokazu Akimoto, Nishikamo-gun (JP); Osamu Harada, Toyota (JP); Takahiro Nishigaki, Nagoya (JP); Akihiro Katayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 111 days.

(21) Appl. No.: 11/666,994

(22) PCT Filed: Feb. 24, 2006

(86) PCT No.: PCT/JP2006/003401

§ 371 (c)(1),
(2), (4) Date: May 3, 2007

(87) PCT Pub. No.: WO2006/090829

PCT Pub. Date: Aug. 31, 2006

(65) Prior Publication Data

US 2008/0148835 A1 Jun. 26, 2008

(30) Foreign Application Priority Data

Feb. 24, 2005 (JP) ............................. 2005-048446
Sep. 7, 2005 (JP) ............................. 2005-259479

(51) Int. Cl.
*G01M 15/00* (2006.01)
(52) U.S. Cl. ................................... 73/114.03
(58) Field of Classification Search .............. 73/114.02, 73/114.03, 114.04, 114.05, 114.11
See application file for complete search history.

(56) References Cited

U.S. PATENT DOCUMENTS 5,539,644 A 7/1996 Ichikawa et al.

(Continued)

FOREIGN PATENT DOCUMENTS

JP A 4-311651 11/1992

(Continued)

*Primary Examiner*—Eric S McCall
(74) *Attorney, Agent, or Firm*—Oliff & Berridge, PLC

(57) ABSTRACT

The engine misfire detection apparatus of the invention successively determines whether a rotational fluctuation difference Nxd360 as a difference between a rotational fluctuation Nxd at a certain crank angle CA of an engine and a rotational fluctuation Nxd at a 360 degree-prior crank angle CA exceeds a predetermined reference value A1 (step S150) and whether a rotational fluctuation difference Nxd720 as a difference between the rotational fluctuation Nxd at the certain crank angle CA and a rotational fluctuation Nxd at a 720 degree-prior crank angle CA exceeds a predetermined reference value B1 (step S160). The engine misfire detection apparatus detects a misfire of the engine upon satisfaction of all conditions regarding rotational fluctuation difference proportions Nja2, Nja3, and Nja4 on the basis of the rotational fluctuation difference Nxd360 (step S200) and all conditions regarding rotational fluctuation difference proportions Njb2, Njb3, and Njb4 on the basis of the rotational fluctuation difference Nxd720 (step S210), when both the rotational fluctuation differences Nxd360 and Nxd720 exceed the respective reference values A1 and B1 (steps S150 and S160). This arrangement ensures adequate and accurate detection of an engine misfire during warm-up of a catalyst included in an exhaust emission control unit with a significant delay of the ignition timing in the engine.

17 Claims, 6 Drawing Sheets

U.S. PATENT DOCUMENTS

| | | | | |
|---|---|---|---|---|
| 5,728,941 A | * | 3/1998 | Yamamoto et al. | 73/114.04 |
| 2002/0050271 A1 | | 5/2002 | Hasegawa et al. | |
| 2007/0157713 A1 | * | 7/2007 | Tsukamoto et al. | 73/117.3 |
| 2007/0261484 A1 | * | 11/2007 | Nishigaki et al. | 73/117.3 |

FOREIGN PATENT DOCUMENTS

| | | |
|---|---|---|
| JP | A 5-18311 | 1/1993 |
| JP | A 6-207553 | 7/1994 |
| JP | A 10-54295 | 2/1998 |
| JP | A 2000-205035 | 7/2000 |
| JP | A 2002-4936 | 1/2002 |
| JP | A 2002-138893 | 5/2002 |
| JP | A 2003-214308 | 7/2003 |

* cited by examiner

ENGINE MISFIRE DETECTION APPARATUS FOR INTERNAL COMBUSTION ENGINE AND ENGINE MISFIRE DETECTION METHOD

TECHNICAL FIELD

The present invention relates to an engine misfire detection apparatus for internal combustion engine and a corresponding engine misfire detection method. More specifically the invention pertains to an engine misfire detection apparatus that detects a misfire in a plural-cylinder internal combustion engine, as well as to a corresponding engine misfire detection method that detects a misfire in the internal combustion engine.

BACKGROUND ART

One proposed engine misfire detection apparatus adopts a specific criterion level lower than a standard criterion level for detection of a misfire of an internal combustion engine during warm-up of a catalyst included in an exhaust emission control unit for catalytic conversion of the exhaust emission from the internal combustion engine (see, for example, Patent Document 1). The proposed apparatus detects a misfire of the internal combustion engine during the catalyst warm-up time when an average rotation speed variation of the internal combustion engine exceeds the specific criterion level lower than the standard criterion level.

[Patent Document 1] Japanese Patent Laid-Open Gazette No. 2002-4936

DISCLOSURE OF THE INVENTION

This prior art engine misfire detection apparatus uses the lower criterion level during the catalyst warm-up time. There may thus be a failure in detection of a misfire. Especially the internal combustion engine mounted on a motor-drivable hybrid vehicle may be operated at a significantly delayed ignition timing to accelerate warm-up of the catalyst. In this case, the internal combustion engine has rather slower combustion. The simple decrease of the criterion level may accordingly lead to inadequate or inaccurate detection of a misfire of the internal combustion engine.

The engine misfire detection apparatus and the corresponding engine misfire detection method of the invention thus aim to ensure adequate detection of a misfire of an internal combustion engine before completion of warm-up. The engine misfire detection apparatus and the corresponding engine misfire detection method of the invention also aim to ensure accurate detection of a misfire of an internal combustion engine even during operation of the internal combustion engine to warm up a catalyst included in an exhaust emission control unit for catalytic conversion of the exhaust emission from the internal combustion engine.

In order to attain at least part of the above and the other related objects, the engine misfire detection apparatus and the corresponding engine misfire detection method of the invention have the configurations described below.

The present invention is directed to an engine misfire detection apparatus that detects a misfire in a plural-cylinder internal combustion engine having a variable ignition timing. The engine misfire detection apparatus includes: a rotational position detection unit that detects a rotational position of a crankshaft of the internal combustion engine; a rotational fluctuation computation module that sequentially calculates rotational fluctuations at crank angles corresponding to respective ignition timings of the plural cylinders in the internal combustion engine, based on the detected rotational positions of the crankshaft of the internal combustion engine; a rotational fluctuation difference computation module that computes a first rotational fluctuation difference and a second rotational fluctuation difference, where the first rotational fluctuation difference represents a difference between each of the rotational fluctuations sequentially calculated at the corresponding crank angles and a rotational fluctuation calculated at a crank angle prior to each of the corresponding crank angles by a preset first angle, and the second rotational fluctuation difference represents a difference between each of the rotational fluctuations sequentially calculated at the corresponding crank angles and a rotational fluctuation calculated at a crank angle prior to each of the corresponding crank angles by a preset second angle that is different from the preset first angle; and an engine misfire detection module that detects a misfire of the internal combustion engine based on the first rotational fluctuation difference and the second rotational fluctuation difference computed by said rotational fluctuation difference computation module, during a time period from a start of the internal combustion engine to satisfaction of a predetermined condition.

The engine misfire detection apparatus of the invention sequentially calculates the rotational fluctuations at the crank angles corresponding to the respective ignition timings of the plural cylinders in the internal combustion engine, based on the rotational positions of the crankshaft of the internal combustion engine. The engine misfire detection apparatus then computes the first rotational fluctuation difference and the second rotational fluctuation difference. The first rotational fluctuation difference represents the difference between each of the rotational fluctuations sequentially calculated at the corresponding crank angles and a rotational fluctuation calculated at a crank angle prior to each of the corresponding crank angles by a preset first angle. The second rotational fluctuation difference represents the difference between each of the rotational fluctuations sequentially calculated at the corresponding crank angles and a rotational fluctuation calculated at a crank angle prior to each of the corresponding crank angles by a preset second angle that is different from the preset first angle. The engine misfire detection apparatus detects a misfire of the internal combustion engine based on the computed first rotational fluctuation difference and the computed second rotational fluctuation difference, during the time period from the start of the internal combustion engine to satisfaction of the predetermined condition. Namely the engine misfire detection apparatus takes advantage of the rotational fluctuation differences from the rotational fluctuations at different prior crank angles. This arrangement ensures adequate detection of the misfire of the internal combustion engine during the time period from the start of the internal combustion engine to satisfaction of the predetermined condition. The 'predetermined condition' may be completion of warm-up of a catalyst included in an exhaust emission control unit of the internal combustion engine. This arrangement ensures adequate and accurate detection of the misfire of the internal combustion engine even during operation of the internal combustion engine to warm up the catalyst included in the exhaust emission control unit. The 'internal combustion engine' may be driven at a start with a delayed ignition timing for warming up the catalyst included in the exhaust emission control unit of the internal combustion engine. This arrangement ensures adequate and accurate detection of the misfire of the internal combustion engine even during operation of the internal combustion engine with the delayed ignition timing for warm-up of the catalyst included in the exhaust emission control unit.

In the engine misfire detection apparatus of the invention, for example, the engine misfire detection module may detect the misfire of the internal combustion engine, when the first rotational fluctuation difference is not less than a preset first value and when the second rotational fluctuation difference is not less than a preset second value that is different from the preset first value. In this case, the predetermined first value may be smaller than the predetermined second value.

In the engine misfire detection apparatus of the invention which detects the misfire of the internal combustion engine when the first rotational fluctuation difference is not less than a preset first value and when the second rotational fluctuation difference is not less than a preset second value, the engine misfire detection module may detect the misfire of the internal combustion engine, when a proportion of a first object rotational fluctuation difference, which is selected as one first rotational fluctuation difference of not less than the preset first value, to another first rotational fluctuation difference other than the first object rotational fluctuation difference is in a predetermined first misfire identification proportion range and when a proportion of a second object rotational fluctuation difference, which is selected as one second rotational fluctuation difference of not less than the preset second value, to another second rotational fluctuation difference other than the second object rotational fluctuation difference is in a predetermined second misfire identification proportion range that is different from the predetermined first misfire identification proportion range. In this case, the another first rotational fluctuation difference may be one of a third-prior first rotational fluctuation difference third before the first object rotational fluctuation difference, an immediate-prior first rotational fluctuation difference immediately before the first object rotational fluctuation difference, and an immediate-posterior first rotational fluctuation difference immediately after the first object rotational fluctuation difference. And the another second rotational fluctuation difference may be one of a third-prior second rotational fluctuation difference third before the second object rotational fluctuation difference, an immediate-prior second rotational fluctuation difference immediately before the second object rotational fluctuation difference, and an immediate-posterior second rotational fluctuation difference immediately after the second object rotational fluctuation difference. This arrangement ensures adequate and accurate detection of the misfire of the internal combustion engine.

In one preferable embodiment of the engine misfire detection apparatus of the invention which detects the misfire of the internal combustion engine when the first rotational fluctuation difference is not less than a preset first value and when the second rotational fluctuation difference is not less than a preset second value, the engine misfire detection module may detect the misfire of the internal combustion engine on condition that an intermediate rotational fluctuation difference is less than a preset intermediate reference value, when the first rotational fluctuation difference is not less than the preset first value and when the second rotational fluctuation difference is not less than the preset second value. The intermediate rotational fluctuation difference represents a difference between a rotational fluctuation at a crank angle prior to each of the corresponding crank angles by a phase angle corresponding to a phase of the plural cylinders and a rotational fluctuation at a crank angle prior to the each corresponding crank angle by multiplication of the phase angle by at least one numerical value selected among the number of the plural cylinders, the number−1, and the number−2. This arrangement ensures adequate detection of the misfire of the internal combustion engine. In this case, the engine misfire detection module may also detect the misfire of the internal combustion engine when all intermediate rotational fluctuation differences, which are given as differences from the rotational fluctuations at the crank angles prior to the multiplications of the phase angle by the number, the number−1, and the number−2, are less than the preset intermediate reference value. This arrangement ensures more adequate detection of the misfire of the internal combustion engine.

In the engine misfire detection apparatus of the invention, the preset first angle and the preset second angle may be 360 degrees and 720 degrees, respectively. The first angle and the second angle are, however, not restricted to these values but may be set arbitrarily.

In one preferable embodiment of the engine misfire detection apparatus of the invention, the rotational fluctuation computation module may compute a rotational angular velocity at every preset crank angle of the crankshaft of the internal combustion engine, and calculates the rotational fluctuation as a difference between a rotational angular velocity at an ignition timing of each of the plural cylinders of the internal combustion engine and a rotational angular velocity at a previous ignition timing prior to the preset crank angle. Further, the rotational fluctuation computation module may calculate a rotational angular acceleration corresponding to an ignition timing of each of the plural cylinders of the internal combustion engine, as the rotational fluctuation at a crank angle corresponding to the ignition timing.

The engine misfire detection apparatus of the invention may be used to detect a misfire of the internal combustion engine that is mounted on a hybrid vehicle and is operated at a drive point set independently of a running condition of the hybrid vehicle.

The present invention is also directed to an engine misfire detection method that detects a misfire in a plural-cylinder internal combustion engine which has a variable ignition timing. The engine misfire detection method includes the steps of: (a) sequentially calculating rotational fluctuations at crank angles corresponding to respective ignition timings of the plural cylinders in the internal combustion engine, based on detected rotational positions of a crankshaft of the internal combustion engine; (b) computing a first rotational fluctuation difference and a second rotational fluctuation difference, where the first rotational fluctuation difference represents a difference between each of the rotational fluctuations sequentially calculated at the corresponding crank angles and a rotational fluctuation calculated at a crank angle prior to each of the corresponding crank angles by a preset first angle, and the second rotational fluctuation difference represents a difference between each of the rotational fluctuations sequentially calculated at the corresponding crank angles and a rotational fluctuation calculated at a crank angle prior to each of the corresponding crank angles by a preset second angle that is different from the preset first angle; and (c) detecting a misfire of the internal combustion engine based on the computed first rotational fluctuation difference and the computed second rotational fluctuation difference, during a time period from a start of the internal combustion engine to satisfaction of a predetermined condition.

The engine misfire detection method of the invention sequentially calculates the rotational fluctuations at the crank angles corresponding to the respective ignition timings of the plural cylinders in the internal combustion engine, based on the rotational positions of the crankshaft of the internal combustion engine. The engine misfire detection method then computes the first rotational fluctuation difference and the second rotational fluctuation difference. The first rotational fluctuation difference represents the difference between each of the rotational fluctuations sequentially calculated at the corresponding crank angles and a rotational fluctuation calculated at a crank angle prior to each of the corresponding crank angles by a preset first angle. The second rotational fluctuation difference represents the difference between each of the rotational fluctuations sequentially calculated at the corresponding crank angles and a rotational fluctuation calculated at a crank angle prior to each of the corresponding crank angles by a preset second angle that is different from the preset first angle. The engine misfire detection method detects a misfire of the internal combustion engine based on the computed first rotational fluctuation difference and the computed second rotational fluctuation difference, during the time period from the start of the internal combustion engine to satisfaction of the predetermined condition. Namely the engine misfire detection method takes advantage of the rotational fluctuation differences from the rotational fluctuations at different prior crank angles. This arrangement ensures adequate detection of the misfire of the internal combustion engine during the time period from the start of the internal combustion engine to satisfaction of the predetermined condition. The 'predetermined condition' may be completion of warm-up of a catalyst included in an exhaust emission control unit of the internal combustion engine. This arrangement ensures adequate and accurate detection of the misfire of the internal combustion engine even during operation of the internal combustion engine to warm up the catalyst included in the exhaust emission control unit. The 'internal combustion engine' may be driven at a start with a delayed ignition timing for warming up the catalyst included in the exhaust emission control unit of the internal combustion engine. This arrangement ensures adequate and accurate detection of the misfire of the internal combustion engine even during operation of the internal combustion engine with the delayed ignition timing for warm-up of the catalyst included in the exhaust emission control unit.

In one preferable embodiment of the engine misfire detection method of the invention, the step (c) detects the misfire of the internal combustion engine during the time period from the start of the internal combustion engine to completion of warm-up of a catalyst included in an exhaust emission control unit of the internal combustion engine. In another preferable embodiment of the engine misfire detection method of the invention, the step (c) detects the misfire of the internal combustion engine, when the first rotational fluctuation difference is not less than a preset first value and when the second rotational fluctuation difference is not less than a preset second value that is different from the preset first value. The preset first value may be smaller than the preset second value.

BEST MODES OF CARRYING OUT THE INVENTION

Figure 1:
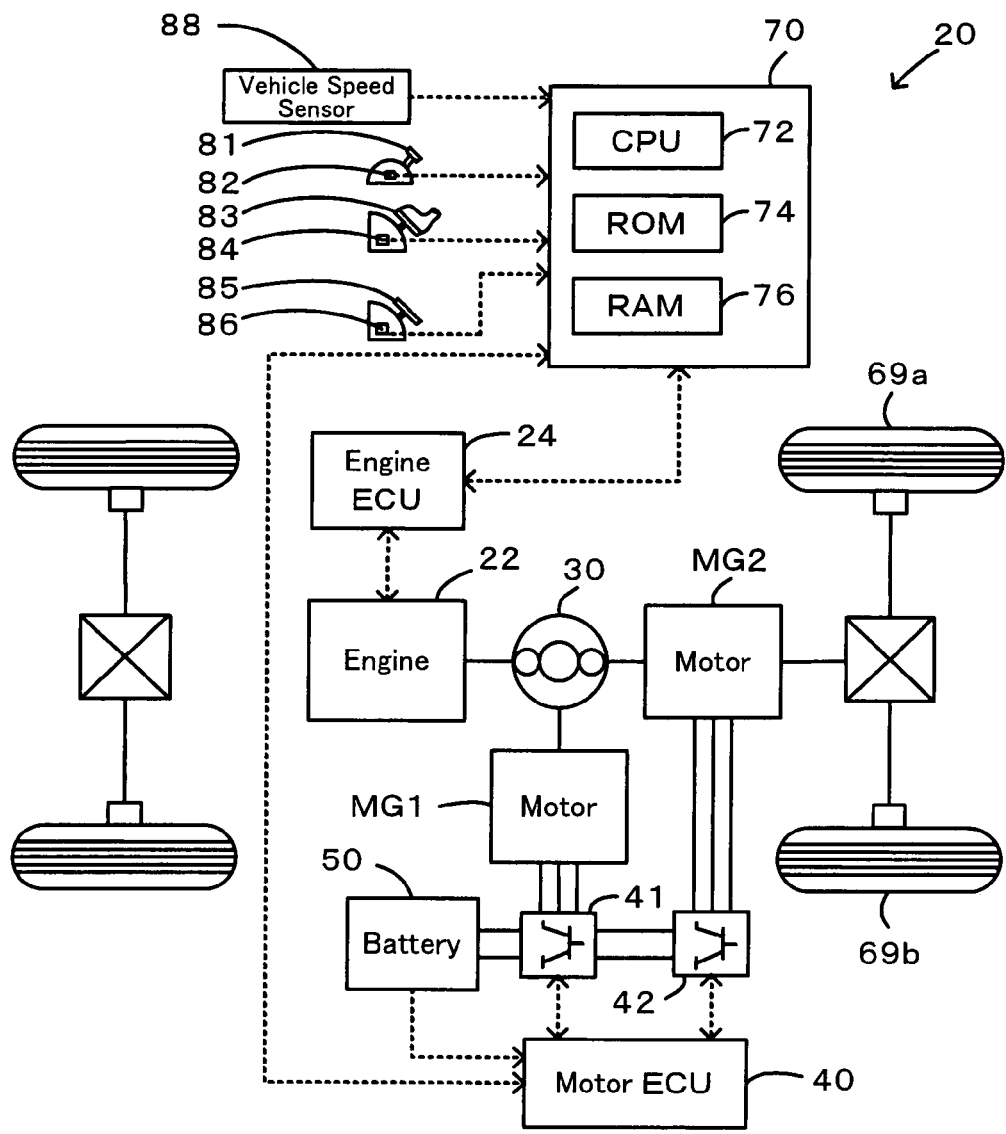
FIG. 1 schematically illustrates the configuration of a hybrid vehicle 20 equipped with an engine misfire detection apparatus for internal combustion engine in one embodiment of the invention.
Figure 2:
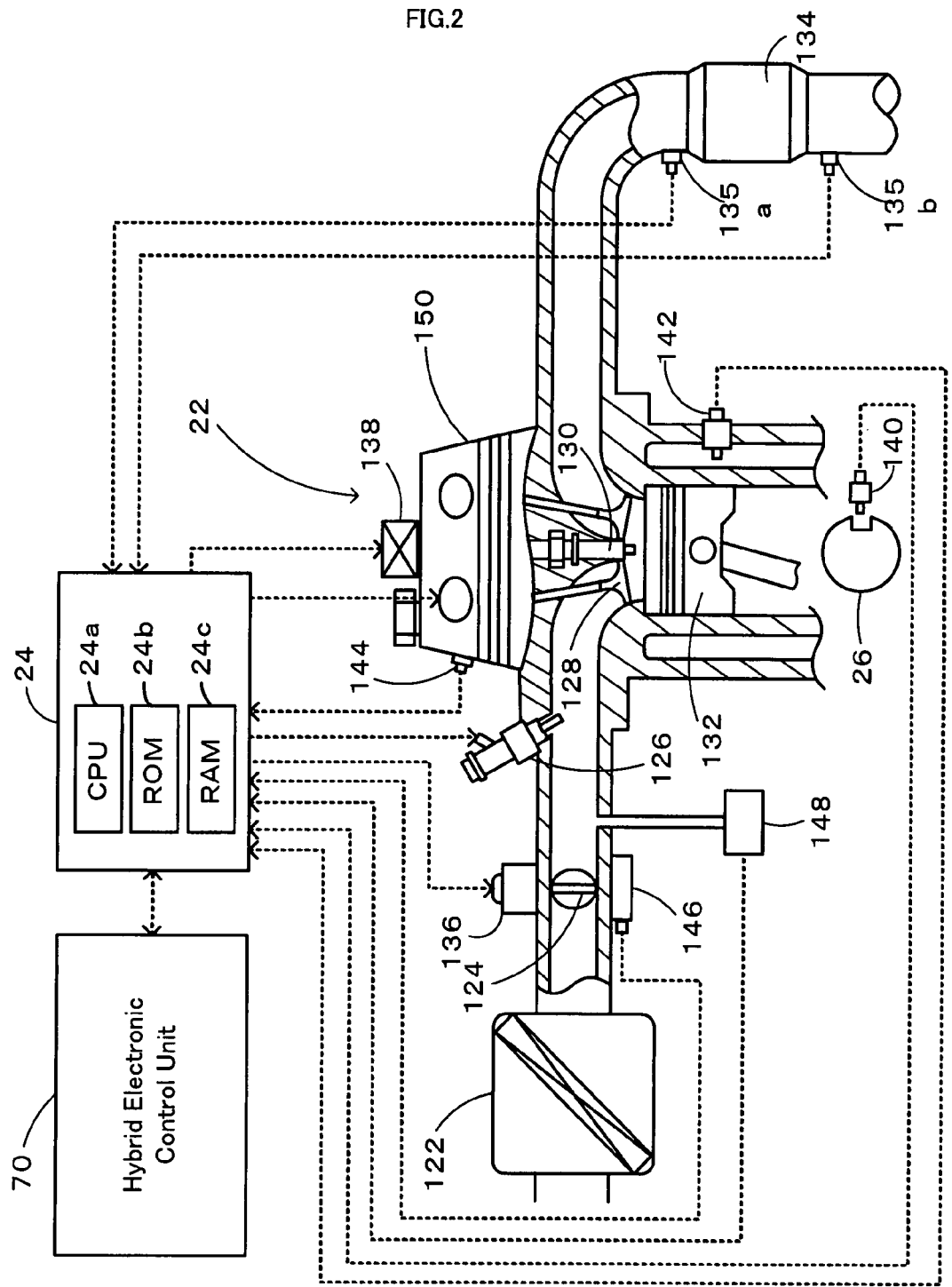
FIG. 2 schematically illustrates the structure of an engine electronic control unit 24 functioning as the engine misfire detection apparatus and an engine 22 driven and controlled by the engine electronic control unit 24.

Some modes of carrying out the invention are described below as preferred embodiments with reference to the accompanied drawings. FIG. 1 schematically illustrates the configuration of a hybrid vehicle 20 equipped with an engine misfire detection apparatus for internal combustion engine in one embodiment of the invention. FIG. 2 schematically illustrates the structure of an engine electronic control unit 24 functioning as the engine misfire detection apparatus and an engine 22 driven and controlled by the engine electronic control unit 24. As shown in FIG. 1, the hybrid vehicle 20 of the embodiment includes the engine 22 that is driven and controlled by the engine electronic control unit 24 (expressed as engine ECU in the drawing), a planetary gear mechanism 30 that has a carrier connecting with a crankshaft 26 or an output shaft of the engine 22 and a ring gear connecting with a driveshaft linked to an axle of drive wheels 69a and 69b, a motor MG1 that is connected with a sun gear of the planetary gear mechanism 30 and is driven and controlled by a motor electronic control unit 40 (expressed as motor ECU in the drawing) via an inverter 41, a motor MG2 that is connected with the driveshaft linked to the axle of the drive wheels 69a and 69b and is driven and controlled by the motor electronic control unit 40 via an inverter 42, a battery 50 that is capable of inputting and outputting electric power from and to the motors MG1 and MG2 via the inverter 41 and 42, and a hybrid electronic control unit 70 that controls the operations of the whole hybrid vehicle 20. The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 is connected with the engine electronic control unit 24 and the motor electronic control unit 40 via the communication port to transmit diversity of control signals and data to and from the engine electronic control unit 24 and the motor electronic control unit 40.

The engine 22 is a straight-six internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through an exhaust emission control unit 134 (filled with three-way catalyst) to convert toxic components included in the exhaust, that is, carbon monoxide (CO), hydrocarbons (HC), and nitrogen oxides (NOx), into harmless components, and is discharged to the outside air. In the engine 22 of the embodiment, the pistons 132 of the respective six cylinders are attached to the crankshaft 26 in such as manner as to shift the ignition timings of the respective cylinders by crank angles CA of 120 degrees.

The engine electronic control unit 24 for controlling the engine 22 is constructed as a microprocessor including a CPU 24a, a ROM 24b that stores processing programs, a RAM 24c that temporarily stores data, a flash memory (not shown), input and output ports (not shown), and a communication port (not shown). The engine electronic control unit 24 receives, via its input port, signals from various sensors that measure and detect the conditions of the engine 22. The signals input into the engine electronic control unit 24 include a crank angle CA from a crank angle sensor 140 detected as the rotational angle of the crankshaft 26, a cooling water temperature Tw from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an intake air flow Ga from a vacuum sensor 148 measured as the loading of the engine 22, an air-fuel ratio AF from an air-fuel ratio sensor 135a located upstream the exhaust emission control unit 134, and an oxygen concentration from an oxygen sensor 135b located downstream the exhaust emission control unit 134. The crank angle sensor 40 is an MRE rotation sensor having magnetic resistance elements arranged at positions facing to magnetic rotors (not shown) mounted on the crankshaft 26. The crank angle sensor 140 outputs a pulse at every preset angle (for example, at a crank angle CA of every 10 degrees). In the structure of the embodiment, the engine electronic control unit 24 utilizes the pulses output from the crank angle sensor 140 to specify the crank angle CA and calculate a rotation speed N of the engine 22. The engine electronic control unit 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. As mentioned above, the engine electronic control unit 24 communicates with the hybrid electronic control unit 70. The engine electronic control unit 24 receives control signals from the hybrid electronic control unit 70 to drive and control the engine 22, while outputting data regarding the driving conditions of the engine 22 to the hybrid electronic control unit 70 according to the requirements.

Figure 3:
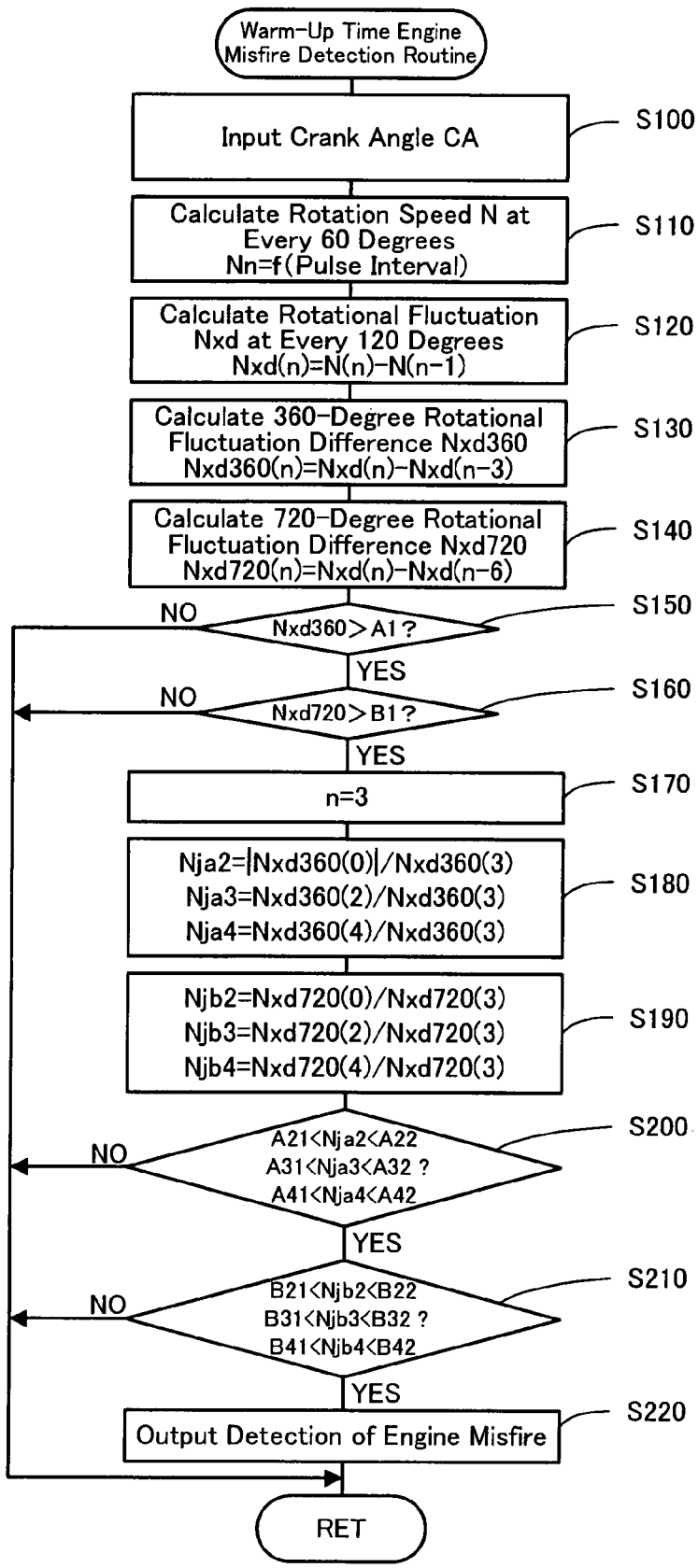
FIG. 3 is a flowchart showing a warm-up time engine misfire detection routine executed by the engine electronic control unit 24 in the embodiment.

The description regards the operations of the hybrid vehicle 20 of the embodiment having the above configuration, especially a series of operations to detect a misfire of the engine 22 by the engine electronic control unit 24 during warm-up of the catalyst in the exhaust emission control unit 134 after the start of the engine 22. FIG. 3 is a flowchart showing a warm-up time engine misfire detection routine executed by the engine electronic control unit 24. The hybrid vehicle 20 of the embodiment is drivable in a motor drive mode with only the output power from the motor MG2, according to the state of charge (SOC) of the battery 50 and the driver's power demand. The engine 22 is thus driven with a significantly delayed ignition timing immediately after the start to accelerate warm-up of the catalyst included in the exhaust emission control unit 134.

In the warm-up time engine misfire detection routine, the CPU 24a of the engine electronic control unit 24 first inputs data required for detection of an engine misfire, for example, the crank angle CA from the crank angle sensor 140 (step S100) and computes a rotation speed N of the crankshaft 26 at a crank angle CA of every 60 degrees, based on the input crank angle CA (step S110). The rotation speed N at the crank angle CA of every 60 degrees is calculated from an interval between a pulse at a certain crank angle CA and a pulse at a 10-degree prior crank angle CA. The CPU 24a subsequently calculates a rotational fluctuation Nxd at a crank angle CA of every 120 degrees corresponding to an ignition timing of each of the six cylinders of the engine 22 as a difference of the rotation speed N at the crank angle CA of every 60 degrees (step S120). The CPU 24a then successively computes a difference between the calculated rotational fluctuation Nxd at a certain crank angle CA and the calculated rotational fluctuation Nxd at a 360 degree-prior crank angle CA as a rotational fluctuation difference Nxd360 (step S130) and a difference between the calculated rotational fluctuation Nxd at the certain crank angle CA and the calculated rotational fluctuation Nxd at a 720 degree-prior crank angle CA as a rotational fluctuation difference Nxd720 (step S140). The rotational fluctuation Nxd is calculated at the crank angle CA of every 120 degrees. The rotational fluctuation Nxd at the 360 degree-prior crank angle CA is thus the rotational fluctuation at a third-prior crank angle CA, and the rotational fluctuation Nxd at the 720 degree-prior crank angle CA is the rotational fluctuation at a sixth-prior crank angle CA. In the flowchart of FIG. 3, the rotational fluctuations are expressed as Nxd(n), Nxd(n−3), and Nxd(n−6).

The computed rotational fluctuation difference Nxd360 is compared with a preset first 360-degree misfire reference value A1 (step S150), whereas the computed rotational fluctuation difference Nxd720 is compared with a preset first 720-degree misfire reference value B1 (step S160). The first 360-degree misfire reference value A1 and the first 720-degree misfire reference value B1 are experimentally or otherwise determined to be smaller than the rotational fluctuation differences Nxd360 and Nxd720 corresponding to an ignition timing of a misfired cylinder but to be greater than the rotational fluctuation differences Nxd360 and Nxd720 corresponding to an ignition timing of a fired cylinder, in the event of a misfire during operation of the engine 22 with a significantly delayed ignition timing to warm up the catalyst included in the exhaust emission control unit 134. In the engine 22 of the embodiment, the first 360-degree misfire reference value A1 is slightly smaller than the first 720-degree misfire reference value B1. When the computed rotational fluctuation difference Nxd360 is not greater than the preset first 360-degree misfire reference value A1 or when the computed rotational fluctuation difference Nxd720 is not greater than the preset first 720-degree misfire reference value B1, the CPU 24a identifies no misfire and exits from the warm-up time engine misfire detection routine.

When the computed rotational fluctuation difference Nxd360 exceeds the preset first 360-degree misfire reference value A1 and when the computed rotational fluctuation difference Nxd720 exceeds the preset first 720-degree misfire reference value B1, the cylinder having the exceeding rotational fluctuation differences Nxd360 and Nxd720 is specified as a misfired cylinder having a third ordinal number of ignition (step S170). The CPU 24a then calculates rotational fluctuation difference proportions Nja2, Nja3, and Nja4 (step S180). The rotational fluctuation difference proportion Nja2 is obtained by dividing a third-prior rotational fluctuation difference Nxd360(0) of a cylinder third before the misfired cylinder by the rotational fluctuation difference Nxd360(3) of the misfired cylinder. The rotational fluctuation difference proportion Nja3 is obtained by dividing an immediate-prior rotational fluctuation difference Nxd360(2) of a cylinder immediately before the misfired cylinder by the rotational fluctuation difference Nxd360(3) of the misfired cylinder. The rotational fluctuation difference proportion Nja4 is obtained by dividing an immediate-posterior rotational fluctuation difference Nxd360(4) of a cylinder immediately after the misfired cylinder by the rotational fluctuation difference Nxd360(3) of the misfired cylinder. The CPU 24a also calculates rotational fluctuation difference proportions Njb2, Njb3, and Njb4 (step S190). The rotational fluctuation difference proportion Njb2 is obtained by dividing a third-prior rotational fluctuation difference Nxd720(0) of a cylinder third before the misfired cylinder by the rotational fluctuation difference Nxd720(3) of the misfired cylinder. The rotational fluctuation difference proportion Njb3 is obtained by dividing an immediate-prior rotational fluctuation difference Nxd720(2) of a cylinder immediately before the misfired cylinder by the rotational fluctuation difference Nxd720(3) of the misfired cylinder. The rotational fluctuation difference proportion Njb4 is obtained by dividing an immediate-posterior rotational fluctuation difference Nxd720(4) of a cylinder immediately after the misfired cylinder by the rotational fluctuation difference Nxd720(3) of the misfired cylinder.

The CPU 24a successively determines whether the calculated rotational fluctuation difference proportion Nja2 is in a range between preset second 360-degree misfire reference values A21 and A22, whether the calculated rotational fluctuation difference proportion Nja3 is in a range between preset third 360-degree misfire reference values A31 and A32, and whether the calculated rotational fluctuation difference proportion Nja4 is in a range between preset fourth 360-degree misfire reference values A41 and A42 (step S200). The CPU 24a also successively determines whether the calculated rotational fluctuation difference proportion Njb2 is in a range between preset second 720-degree misfire reference values B21 and B22, whether the calculated rotational fluctuation difference proportion Njb3 is in a range between preset third 720-degree misfire reference values B31 and B32, and whether the calculated rotational fluctuation difference proportion Njb4 is in a range between preset fourth 720-degree misfire reference values B41 and B42 (step S210). The second 360-degree misfire reference values A21 and A22, the third 360-degree misfire reference values A31 and A32, and the fourth 360-degree misfire reference values A41 and A42 are experimentally or otherwise specified to be smaller than and greater than the rotational fluctuation difference proportion Nja2, to be smaller than and greater than the rotational fluctuation difference proportion Nja3, and to be smaller than and greater than the rotational fluctuation difference proportion Nja4, in the event of a misfire during operation of the engine 22 with a significantly delayed ignition timing to warm up the catalyst included in the exhaust emission control unit 134. The second 720-degree misfire reference values B21 and B22, the third 720-degree misfire reference values B31 and B32, and the fourth 720-degree misfire reference values B41 and B42 are experimentally or otherwise specified to be smaller than and greater than the rotational fluctuation difference proportion Njb2, to be smaller than and greater than the rotational fluctuation difference proportion Njb3, and to be smaller than and greater than the rotational fluctuation difference proportion Njb4, in the event of a misfire during operation of the engine 22 with a significantly delayed ignition timing to warm up the catalyst included in the exhaust emission control unit 134. When the rotational fluctuation difference proportion Nja2 is in the range of the second 360-degree misfire reference values A21 and A22, the rotational fluctuation difference proportion Nja3 is in the range of the third 360-degree misfire reference values A31 and A32, and the rotational-fluctuation difference proportion Nja4 is in the range of the fourth 360-degree misfire reference values A41 and A42, and when the rotational fluctuation difference proportion Njb2 is in the range of the second 720-degree misfire reference values B21 and B22, the rotational fluctuation difference proportion Njb3 is in the range of the third 720-degree misfire reference values B31 and B32, and the rotational fluctuation difference proportion Njb4 is in the range of the fourth 720-degree misfire reference values B41 and B42, the CPU 24a outputs detection of a misfire (step S220) and exits from the warm-up time engine misfire detection routine. When any of the rotational fluctuation difference proportions Nja2, Nja3, and Nja4 is out of the range of the second 360-degree misfire reference values A21 and A22, out of the range of the third 360-degree misfire reference values A31 and A32, or out of the range of the fourth 360-degree misfire reference values A41 and A42, or when any of the rotational fluctuation difference proportions Njb2, Njb3, and Njb4 is out of the range of the second 720-degree misfire reference values B21 and B22, out of the range of the third 720-degree misfire reference values B31 and B32, or out of the range of the fourth 720-degree misfire reference values B41 and B42, the CPU 24a identifies no detection of a misfire and exits from the warm-up time engine misfire detection routine.

Figure 4:
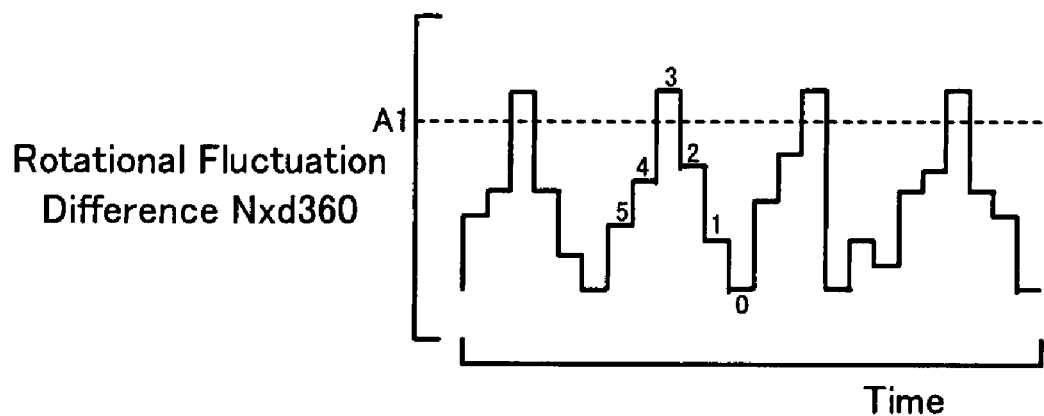
FIG. 4 is a graph showing a time change in rotational fluctuation difference Nxd360 in the event of a misfire.
Figure 5:
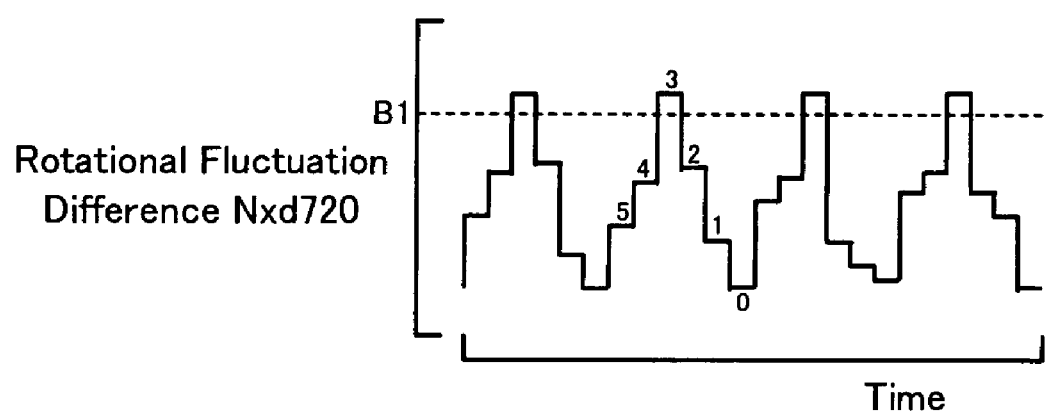
FIG. 5 is a graph showing a time change in rotational fluctuation difference Nxd720 in the event of a misfire.

FIG. 4 is a graph showing a time change in rotational fluctuation difference Nxd360 in the event of a misfire. FIG. 5 is a graph showing a time change in rotational fluctuation difference Nxd720 in the event of a misfire. Relatively slow combustion during operation of the engine 22 with a significantly delayed ignition timing to warm up the catalyst included in the exhaust emission control unit 134 causes a variation in rotational fluctuation and a varying pattern of the rotational fluctuation difference. There may thus be a slight difference between the rotational fluctuation difference Nxd360 and the rotational fluctuation difference Nxd720. Regardless the slight difference between the rotational fluctuation difference Nxd360 and the rotational fluctuation difference Nxd720, however, a rotational fluctuation difference of a misfired cylinder is significantly greater than a rotational fluctuation difference of a fired cylinder. As illustrated, in the event of a misfire, the rotational fluctuation difference Nxd360 in only one certain cylinder of one cycle distinctly exceeds the first 360-degree misfire reference value A1, while the rotational fluctuation difference Nxd720 in the certain cylinder distinctly exceeds the first 720-degree misfire reference value B1. In order to eliminate the potential for erroneous detection, the procedure of the embodiment detects an engine misfire, based on the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720, in addition to the results of comparison that the rotational fluctuation difference Nxd360 in a certain cylinder exceeds the first 360-degree misfire reference value A1 and that the rotational fluctuation difference Nxd720 in the certain cylinder exceeds the first 720-degree misfire reference value B1. The warm-up time engine misfire detection process of this embodiment ensures adequate and accurate detection of an engine misfire during warm-up of the catalyst included in the exhaust emission control unit 134 with a significant delay of the ignition timing in the engine 22.

As described above, the engine misfire detection apparatus of the embodiment mounted on the hybrid vehicle 20 detects an engine misfire, upon satisfaction of the predetermined conditions with regard to the rotational fluctuation difference Nxd360 computed as the difference from the rotational fluctuation Nxd at the 360 degree-prior crank angle CA and with regard to the rotational fluctuation difference Nxd720 computed as the difference from the rotational fluctuation Nxd at the 720 degree-prior crank angle CA. This arrangement enables the more adequate and accurate detection of an engine misfire during warm-up of the catalyst included in the exhaust emission control unit 134 with a significant delay of the ignition timing in the engine 22, compared with the engine misfire detection based on only the rotational fluctuation difference Nxd360 or the engine misfire detection based on only the rotational fluctuation difference Nxd720. The engine misfire detection apparatus of the embodiment detects an engine misfire, based on the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720, in addition to the results of the comparisons that the rotational fluctuation difference Nxd360 in a certain cylinder exceeds the first 360-degree misfire reference value A1 and that the rotational fluctuation difference Nxd720 in the certain cylinder exceeds the first 720-degree misfire reference value B1. This arrangement further enhances the adequacy and the accuracy of detection of an engine misfire.

The engine misfire detection apparatus of the embodiment mounted on the hybrid vehicle 20 detects an engine misfire, based on both the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720, in addition to the results of comparison that the rotational fluctuation difference Nxd360 in a certain cylinder exceeds the first 360-degree misfire reference value A1 and that the rotational fluctuation difference Nxd720 in the certain cylinder exceeds the first 720-degree misfire reference value B1. One possible modification may detect an engine misfire, based on either of the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720, in addition to the results of comparison that the rotational fluctuation difference Nxd360 in a certain cylinder exceeds the first 360-degree misfire reference value A1 and that the rotational fluctuation difference Nxd720 in the certain cylinder exceeds the first 720-degree misfire reference value B1. Another possible modification may detect an engine misfire, based on only the results of comparison that the rotational fluctuation difference Nxd360 in a certain cylinder exceeds the first 360-degree misfire reference value A1 and that the rotational fluctuation difference Nxd720 in the certain cylinder exceeds the first 720-degree misfire reference value B1. All of the rotational fluctuation difference proportions Nja2, Nja3, and Nja4 with regard to the rotational fluctuation difference Nxd360 are not essential, but only part of such rotational fluctuation difference proportions Nja2, Nja3, and Nja4 may be used as part of the basis for detection of an engine misfire. Similarly, all of the rotational fluctuation difference proportions Njb2, Njb3, and Njb4 with regard to the rotational fluctuation difference Nxd720 are not essential, but only part of such rotational fluctuation difference proportions Njb2, Njb3, and Njb4 may be used as part of the basis for detection of an engine misfire. As part of the basis for detection of an engine misfire, other rotational fluctuation difference proportions with regard to the rotational fluctuation difference Nxd360 and other rotational fluctuation difference proportions with regard to the rotational fluctuation difference Nxd720 may replace the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720.

The engine misfire detection apparatus of the embodiment mounted on the hybrid vehicle 20 detects an engine misfire during warm-up of the catalyst included in the exhaust emission control unit 134 with a significant delay of the ignition timing in the engine 22, upon satisfaction of the predetermined conditions with regard to the rotational fluctuation difference Nxd360 computed as the difference from the rotational fluctuation Nxd at the 360 degree-prior crank angle CA and with regard to the rotational fluctuation difference Nxd720 computed as the difference from the rotational fluctuation Nxd at the 720 degree-prior crank angle CA. The rotational fluctuation differences Nxd360 and Nxd720 are, however, not restrictive at all. Any two different rotational fluctuation differences computed as differences from the rotational fluctuations Nxd at any different degree-prior crank angles CA may be used for detection of a misfire of the engine 22 during warm-up of the catalyst.

The engine misfire detection apparatus of the embodiment mounted on the hybrid vehicle 20 calculates the rotational fluctuation Nxd at the crank angle CA of every 120 degrees corresponding to the ignition timing of each of the six cylinders of the engine 22 as the difference of the rotation speed N at the crank angle CA of every 60 degrees. The rotational fluctuation Nxd may alternatively be computed as a difference of the rotation speed N at the crank angle CA of every another different degrees. The rotational fluctuation Nxd may otherwise be given as a rotational angular acceleration at the crank angle CA of every 120 degrees corresponding to the ignition timing of each of the six cylinders of the engine 22.

The engine misfire detection apparatus of the embodiment mounted on the hybrid vehicle 20 detects a misfire in the straight-six internal combustion engine 22. The procedure of this embodiment is applicable to detect a misfire in an engine having any number of multiple cylinders.

Figure 6:
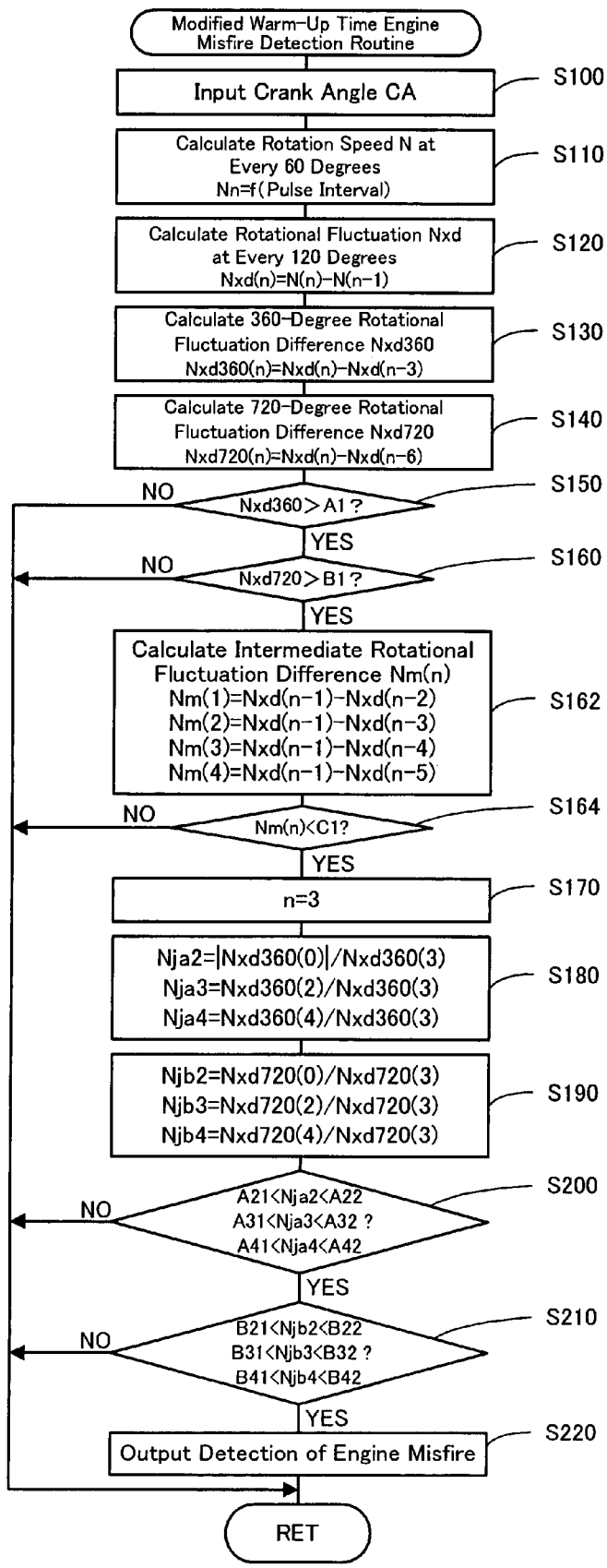
FIG. 6 is a flowchart showing a warm-up time engine misfire detection routine executed by the engine electronic control unit 24 in a second embodiment.

Another engine misfire detection apparatus mounted on a hybrid vehicle 20B is described below as a second embodiment of the invention. The hardware configuration of the hybrid vehicle 20B of the second embodiment is identical with that of the hybrid vehicle 20 of the first embodiment shown in FIGS. 1 and 2 and is thus not specifically described here. The hybrid vehicle 20B of the second embodiment executes a warm-up time engine misfire detection routine shown in the flowchart of FIG. 6, in place of the warm-up time engine misfire detection routine shown in the flowchart of FIG. 3. The warm-up time engine misfire detection routine of FIG. 6 is the same as the warm-up time engine misfire detection routine of FIG. 3, except execution of additional steps S162 and S164 after the processing of steps S160. The following description mainly regards the different points of the warm-up time engine misfire detection routine of the second embodiment from the warm-up time engine misfire detection routine of the first embodiment explained previously.

In the warm-up time engine misfire detection routine of the second embodiment, the CPU 24a of the engine electronic control unit 24 first inputs data required for detection of an engine misfire, for example, the crank angle CA from the crank angle sensor 140 (step S100) and computes the rotation speed N of the crankshaft 26 at the crank angle CA of every 60 degrees, based on the input crank angle CA (step S110). The CPU 24a subsequently calculates the rotational fluctuation Nxd at the crank angle CA of every 120 degrees corresponding to the ignition timing of each of the six cylinders of the engine 22 as the difference of the rotation speed N at the crank angle CA of every 60 degrees (step S120). The CPU 24a then successively computes the difference between the calculated rotational fluctuation Nxd at a certain crank angle CA and the calculated rotational fluctuation Nxd at the 360 degree-prior crank angle CA as the rotational fluctuation difference Nxd360 (step S130) and the difference between the calculated rotational fluctuation Nxd at the certain crank angle CA and the calculated rotational fluctuation Nxd at the 720 degree-prior crank angle CA as the rotational fluctuation difference Nxd720 (step S140). The computed rotational fluctuation difference Nxd360 is compared with the preset first 360-degree misfire reference value A1 (step S150), whereas the computed rotational fluctuation difference Nxd720 is compared with the preset first 720-degree misfire reference value B1 (step S160). When the computed rotational fluctuation difference Nxd360 is not greater than the preset first 360-degree misfire reference value A1 or when the computed rotational fluctuation difference Nxd720 is not greater than the preset first 720-degree misfire reference value B1, the CPU 24a identifies no misfire and exits from the warm-up time engine misfire detection routine of FIG. 6.

Figure 7:
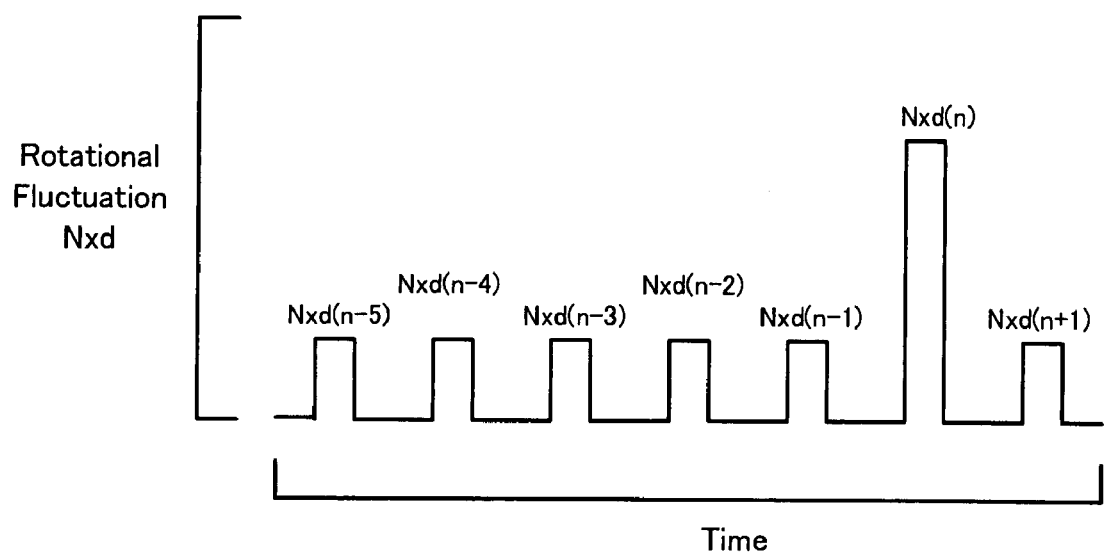
FIG. 7 is a graph showing a time change in rotational fluctuation Nxd(n) in the event of a misfire.

When the computed rotational fluctuation difference Nxd360 exceeds the preset first 360-degree misfire reference value A1 and when the computed rotational fluctuation difference Nxd720 exceeds the preset first 720-degree misfire reference value B1, intermediate rotational fluctuation differences Nm(1) through Nm(4) are computed respectively as differences between a rotational fluctuation Nxd(n−1) at a 120 degree-prior crank angle CA and rotational fluctuations Nxd(n−2), Nxd(n−3), Nxd(n−4), and Nxd(n−5) at further 120 degree-prior crank angle CA, further 240 degree-prior crank angle CA, further 360 degree-prior crank angle CA, and 540 degree-prior crank angle CA (step S162). The CPU 24a then determines whether all of the computed intermediate rotational fluctuation differences Nm(1) through Nm(4) are lower than a preset intermediate misfire reference value C1 (step S164). The rotational fluctuation Nxd (n−1) regards an immediate-prior cylinder fired immediately before a certain cylinder, which has a rotational fluctuation Nxd(n) and is expected to be misfired based on the rotational fluctuation difference Nxd360 and the rotational fluctuation difference Nxd720. The rotational fluctuations Nxd(n−2), Nxd(n−3), Nxd(n−4), and Nxd(n−5) respectively regard a first-prior cylinder, a second-prior cylinder, a third-prior cylinder, and a fourth-prior cylinder that are fired one cylinder, two cylinders, three cylinders, and four cylinders before the fired immediate-prior cylinder. As shown in FIG. 7, the intermediate rotational fluctuation differences Nm(1) through Nm(4) represent the differences of the rotational fluctuations Nxd(n−2), Nxd (n−3), Nxd(n−4), and Nxd(n−5) from the rotational fluctuation Nxd(n−1). Namely the intermediate rotational fluctuation differences Nm(1) through Nm(4) represent the differences between the rotational fluctuation at the immediate-prior cylinder expected to be normally fired (that is, expected not to be misfired) and the rotational fluctuations at the further prior cylinders before the immediate-prior cylinder. The normally fired cylinders have similar rotational fluctuations, so that there are significantly small differences between the rotational fluctuations at the normally fired cylinders. The intermediate rotational fluctuation differences Nm(1) through Nm(4) accordingly have small values. The procedure of the second embodiment specifies the intermediate misfire reference value C1 by taking into account these conditions. The intermediate misfire reference value C1 is set to be greater than a standard difference between rotational fluctuations at non-misfired or fired cylinders.

When all of the intermediate rotational fluctuation differences Nm(1) through Nm(4) are less than the preset intermediate misfire reference value C1, the cylinder having the rotational fluctuation differences Nxd360 and Nxd720 respectively exceeding the first 360-degree misfire reference value A1 and the first 720-degree misfire reference value B1 is specified as a misfired cylinder having a third ordinal number of ignition (step S170). In The CPU 24a then calculates the rotational fluctuation difference proportions Nja2, Nja3, and Nja4 (step S180) and the rotational fluctuation difference proportions Njb2, Njb3, and Njb4 (step S190) and detects an engine misfire based on the calculated rotational fluctuation difference proportions Nja2, Nja3, and Nja4 and the calculated rotational fluctuation difference proportions Njb2, Njb3, and Njb4 (steps S200 to S220), in the same manner as the warm-up time engine misfire detection routine of the first embodiment. When any of the intermediate rotational fluctuation differences Nm(1) through Nm(4) is not less than the preset intermediate misfire reference value C1, on the other hand, the CPU 24a identifies no misfire and exits from the warm-up time engine misfire detection routine of FIG. 6 without the misfire detection based on the calculated rotational fluctuation difference proportions Nja2, Nja3, and Nja4 and the calculated rotational fluctuation difference proportions Njb2, Njb3, and Njb4.

As described above, the engine misfire detection apparatus of the second embodiment mounted on the hybrid vehicle 20B first identifies satisfaction or non-satisfaction of the predetermined conditions with regard to the rotational fluctuation difference Nxd360 computed as the difference from the rotational fluctuation Nxd at the 360 degree-prior crank angle CA and with regard to the rotational fluctuation difference Nxd720 computed as the difference from the rotational fluctuation Nxd at the 720 degree-prior crank angle CA. Upon satisfaction of the predetermined conditions, the engine misfire detection apparatus of the second embodiment calculates the intermediate rotational fluctuation differences Nm(1) through Nm(4). The intermediate rotational fluctuation differences Nm(1) through Nm(4) represent the differences of the rotational fluctuations Nxd(n−2), Nxd(n−3), Nxd(n−4), and Nxd(n−5) from the rotational fluctuation Nxd(n−1). The rotational fluctuation Nxd(n−1) regards the immediate-prior cylinder fired immediately before the certain cylinder, which has the rotational fluctuation Nxd(n) and is expected to be misfired based on the rotational fluctuation difference Nxd360 and the rotational fluctuation difference Nxd720. The rotational fluctuations Nxd(n−2), Nxd(n−3), Nxd(n−4), and Nxd(n−5) respectively regard the first-prior cylinder, the second-prior cylinder, the third-prior cylinder, and the fourth-prior cylinder that are fired one cylinder, two cylinders, three cylinders, and four cylinders before the fired immediate-prior cylinder. The engine misfire detection apparatus of the second embodiment detects an engine misfire when all of the intermediate rotational fluctuation differences Nm(1) through Nm(4) are less than the intermediate misfire reference value C1, which is set to be greater than the standard difference between rotational fluctuations at non-misfired or fired cylinders. This arrangement enables adequate and accurate detection of an engine misfire during warm-up of the catalyst included in the exhaust emission control unit 134 with a significant delay of the ignition timing in the engine 22. The engine misfire detection apparatus of the second embodiment detects an engine misfire, based on the rotational fluctuation difference proportions Nja2, Nja3, and Nja4 with regard to the rotational fluctuation difference Nxd360 and the rotational fluctuation difference proportions Njb2, Njb3, and Njb4 with regard to the rotational fluctuation difference Nxd720, in addition to the results of the comparisons with regard to the rotational fluctuation difference Nxd360 and the rotational fluctuation difference Nxd720 and the results of the comparisons with regard to the intermediate rotational fluctuation differences Nm(1) through Nm(4). This arrangement further enhances the adequacy and the accuracy of detection of an engine misfire.

The engine misfire detection apparatus of the second embodiment mounted on the hybrid vehicle 20B calculates the four intermediate rotational fluctuation differences Nm(1) through Nm(4) as the differences of the rotational fluctuations Nxd(n−2), Nxd(n−3), Nxd(n−4), and Nxd(n−5) from the rotational fluctuation Nxd(n−1). The rotational fluctuation Nxd(n−1) regards the immediate-prior cylinder fired immediately before the certain cylinder, which has the rotational fluctuation Nxd(n) and is expected to be misfired based on the rotational fluctuation difference Nxd360 and the rotational fluctuation difference Nxd720. The rotational fluctuations Nxd(n−2), Nxd(n−3), Nxd(n−4), and Nxd(n−5) respectively regard the first-prior cylinder, the second-prior cylinder, the third-prior cylinder, and the fourth-prior cylinder that are fired one cylinder, two cylinders, three cylinders, and four cylinders before the fired immediate-prior cylinder. The engine misfire detection apparatus of the second embodiment detects an engine misfire, on condition that all of the four intermediate rotational fluctuation differences Nm(1) through Nm(4) are less than the preset intermediate misfire reference value C1. All of the four intermediate rotational fluctuation differences Nm(1) through Nm(4) are, however, not essential. One modified procedure may calculate three or a less number of intermediate rotational fluctuation differences among the four intermediate rotational fluctuation differences Nm(1) through Nm(4) and detect an engine misfire on condition that all of the calculated intermediate rotational fluctuation differences are less than the preset intermediate misfire reference value C1.

The hybrid vehicle 20B of the second embodiment has the straight-six internal combustion engine as the engine 22. The procedure of the second embodiment accordingly calculates the four intermediate rotational fluctuation differences Nm(1) through Nm(4). The technique of the second embodiment is applicable to any engine having three or more cylinders and calculates (number of cylinders−2) intermediate rotational fluctuation differences.

The above embodiments regard the engine misfire detection apparatus mounted on the hybrid vehicle 20 that is equipped with the engine 22, the planetary gear mechanism 30, and the two motors MG1 and MG2. The technique of the invention may be actualized by an engine misfire detection apparatus mounted on any hybrid vehicles of other configurations and by an engine misfire detection apparatus mounted on any motor vehicles of other configurations. Other applications of the invention include an engine misfire detection apparatus mounted on any moving bodies other than the motor vehicles and an engine misfire detection apparatus built in stationary equipment.

The above embodiments regard the engine misfire detection apparatus for the engine 22 mounted on the hybrid vehicle 20. The technique of the invention is also actualized by a corresponding engine misfire detection method of detecting a misfire of the engine 22 mounted on the hybrid vehicle 20, as well as by an engine misfire detection method of detecting a misfire of an engine mounted on any motor vehicles of other configurations.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to the manufacturing industries of internal combustion engines and engine misfire detection apparatuses for internal combustion engines and other relevant industries.

The invention claimed is:

1. An engine misfire detection apparatus that detects a misfire in a plural-cylinder internal combustion engine having a variable ignition timing, said engine misfire detection apparatus comprising:
 a rotational position detection unit that detects a rotational position of a crankshaft of the internal combustion engine;
 a rotational fluctuation computation module that sequentially calculates rotational fluctuations at crank angles corresponding to respective ignition timings of the plural cylinders in the internal combustion engine, based on the detected rotational positions of the crankshaft of the internal combustion engine;
 a rotational fluctuation difference computation module that computes a first rotational fluctuation difference and a second rotational fluctuation difference, where the first rotational fluctuation difference represents a difference between each of the rotational fluctuations sequentially calculated at the corresponding crank angles and a rotational fluctuation calculated at a crank angle prior to each of the corresponding crank angles by a preset first angle, and the second rotational fluctuation difference represents a difference between each of the rotational fluctuations sequentially calculated at the corresponding crank angles and a rotational fluctuation calculated at a crank angle prior to each of the corresponding crank angles by a preset second angle that is different from the preset first angle; and
 an engine misfire detection module that detects a misfire of the internal combustion engine based on the first rotational fluctuation difference and the second rotational fluctuation difference computed by said rotational fluctuation difference computation module, during a time period from a start of the internal combustion engine to satisfaction of a predetermined condition.

2. An engine misfire detection apparatus in accordance with claim 1, wherein the predetermined condition is completion of warm-up of a catalyst included in an exhaust emission control unit of the internal combustion engine.

3. An engine misfire detection apparatus in accordance with claim 1, wherein the internal combustion engine is driven at a start with a delayed ignition timing for warming up a catalyst included in an exhaust emission control unit of the internal combustion engine.

4. An engine misfire detection apparatus in accordance with claim 1, wherein the preset first angle is 360 degrees and the preset second angle is 720 degrees.

5. An engine misfire detection apparatus in accordance with claim 1, wherein said rotational fluctuation computation module computes a rotational angular velocity at every preset crank angle of the crankshaft of the internal combustion engine, and calculates the rotational fluctuation as a difference between a rotational angular velocity at an ignition timing of each of the plural cylinders of the internal combustion engine and a rotational angular velocity at a previous ignition timing prior to the preset crank angle.

6. An engine misfire detection apparatus in accordance with claim 1, wherein said rotational fluctuation computation module calculates a rotational angular acceleration corresponding to an ignition timing of each of the plural cylinders of the internal combustion engine, as the rotational fluctuation at a crank angle corresponding to the ignition timing.

7. An engine misfire detection apparatus in accordance with claim 1, wherein the internal combustion engine is mounted on a hybrid vehicle and is operated at a drive point set independently of a running condition of the hybrid vehicle.

8. An engine misfire detection apparatus in accordance with claim 1, wherein said engine misfire detection module detects the misfire of the internal combustion engine, when the first rotational fluctuation difference is not less than a preset first value and when the second rotational fluctuation difference is not less than a preset second value that is different from the preset first value.

9. An engine misfire detection apparatus in accordance with claim 8, wherein the preset first value is smaller than the preset second value.

10. An engine misfire detection apparatus in accordance with claim 8, wherein said engine misfire detection module detects the misfire of the internal combustion engine, when a proportion of a first object rotational fluctuation difference, which is selected as one first rotational fluctuation difference of not less than the preset first value, to another first rotational fluctuation difference other than the first object rotational fluctuation difference is in a predetermined first misfire identification proportion range and when a proportion of a second object rotational fluctuation difference, which is selected as one second rotational fluctuation difference of not less than the preset second value, to another second rotational fluctuation difference other than the second object rotational fluctuation difference is in a predetermined second misfire identification proportion range that is different from the predetermined first misfire identification proportion range.

11. An engine misfire detection apparatus in accordance with claim 10, wherein the another first rotational fluctuation difference is one of a third-prior first rotational fluctuation difference third before the first object rotational fluctuation difference, an immediate-prior first rotational fluctuation difference immediately before the first object rotational fluctuation difference, and an immediate-posterior first rotational fluctuation difference immediately after the first object rotational fluctuation difference, and the another second rotational fluctuation difference is one of a third-prior second rotational fluctuation difference third before the second object rotational fluctuation difference, an immediate-prior second rotational fluctuation difference immediately before the second object rotational fluctuation difference, and an immediate-posterior second rotational fluctuation difference immediately after the second object rotational fluctuation difference.

12. An engine misfire detection apparatus in accordance with claim 8, wherein said engine misfire detection module detects the misfire of the internal combustion engine on condition that an intermediate rotational fluctuation difference is less than a preset intermediate reference value, when the first rotational fluctuation difference is not less than the preset first value and when the second rotational fluctuation difference is not less than the preset second value, where the intermediate rotational fluctuation difference represents a difference between a rotational fluctuation at a crank angle prior to each of the corresponding crank angles by a phase angle corresponding to a phase of the plural cylinders and a rotational fluctuation at a crank angle prior to the each corresponding crank angle by multiplication of the phase angle by at least one numerical value selected among the number of the plural cylinders, the number−1, and the number−2.

13. An engine misfire detection apparatus in accordance with claim 12, wherein said engine misfire detection module detects the misfire of the internal combustion engine when all intermediate rotational fluctuation differences, which are given as differences from the rotational fluctuations at the crank angles prior to the multiplications of the phase angle by the number, the number−1, and the number−2, are less than the preset intermediate reference value.

14. An engine misfire detection method that detects a misfire in a plural-cylinder internal combustion engine having a variable ignition timing, said engine misfire detection method comprising the steps of:
(a) sequentially calculating rotational fluctuations at crank angles corresponding to respective ignition timings of the plural cylinders in the internal combustion engine, based on detected rotational positions of a crankshaft of the internal combustion engine;
(b) computing a first rotational fluctuation difference and a second rotational fluctuation difference, where the first rotational fluctuation difference represents a difference between each of the rotational fluctuations sequentially calculated at the corresponding crank angles and a rotational fluctuation calculated at a crank angle prior to each of the corresponding crank angles by a preset first angle, and a second rotational fluctuation difference represents a difference between each of the rotational fluctuations sequentially calculated at the corresponding crank angles and a rotational fluctuation calculated at a crank angle prior to each of the corresponding crank angles by a preset second angle that is different from the preset first angle; and
(c) detecting a misfire of the internal combustion engine based on the computed first rotational fluctuation difference and the computed second rotational fluctuation difference, during a time period from a start of the internal combustion engine to satisfaction of a predetermined condition.

15. An engine misfire detection method in accordance with claim 14, wherein said step (c) detects the misfire of the internal combustion engine during the time period from the start of the internal combustion engine to completion of warm-up of a catalyst included in an exhaust emission control unit of the internal combustion engine.

16. An engine misfire detection method in accordance with claim 14, wherein said step (c) detects the misfire of the internal combustion engine, when the first rotational fluctuation difference is not less than a preset first value and when the second rotational fluctuation difference is not less than a preset second value that is different from the preset first value.

17. An engine misfire detection method in accordance with claim 14, said engine misfire detection method detecting the misfire of the internal combustion engine that is driven at a start with a delayed ignition timing for warming up a catalyst included in an exhaust emission control unit of the internal combustion engine.

* * * * *